United States Patent
Iijima (10) Patent No.: US 8,205,977 B2
(45) Date of Patent: Jun. 26, 2012

(54) DEGASSING METHOD OF INK-JET INK, PRODUCTION METHOD OF INK-JET INK AND INK-JET PRINTER

(75) Inventor: Hirotaka Iijima, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1036 days.

(21) Appl. No.: 12/095,080

(22) PCT Filed: Nov. 17, 2006

(86) PCT No.: PCT/JP2006/322946
§ 371 (c)(1),
(2), (4) Date: May 27, 2008

(87) PCT Pub. No.: WO2007/063720
PCT Pub. Date: Jun. 7, 2007

(65) Prior Publication Data
US 2009/0167829 A1     Jul. 2, 2009

(30) Foreign Application Priority Data

Nov. 30, 2005  (JP) ................ 2005-345472
Nov. 30, 2005  (JP) ................ 2005-345473
Jan. 6, 2006   (JP) ................ 2006-001265

(51) Int. Cl.
B41J 2/19     (2006.01)
(52) U.S. Cl. ............... 347/92; 347/84; 347/85; 347/89; 347/95
(58) Field of Classification Search ............ 347/84, 347/85, 89, 92, 100, 95
See application file for complete search history.

(56) References Cited

U.S. PATENT DOCUMENTS

| | | | | |
|---|---|---|---|---|
| 4,664,681 A | * | 5/1987 | Anazawa et al. | 96/10 |
| 5,184,148 A | * | 2/1993 | Suga et al. | 347/100 |
| 6,447,679 B1 | * | 9/2002 | Watari et al. | 210/500.23 |
| 6,790,262 B2 | * | 9/2004 | Sengupta et al. | 96/6 |
| 2003/0116015 A1 | * | 6/2003 | Sengupta et al. | 95/46 |
| 2005/0185010 A1 | * | 8/2005 | Kojima | 347/17 |
| 2005/0217536 A1 | | 10/2005 | Takagi | |

FOREIGN PATENT DOCUMENTS

| | | |
|---|---|---|
| EP | 1174175 | 1/2002 |
| EP | 1243310 | 9/2002 |
| JP | 11209670 | 8/1999 |
| JP | 200589500 | 4/2005 |
| JP | 200597348 | 4/2005 |
| JP | 2005263880 | 9/2005 |
| JP | 2005281523 | 10/2005 |
| JP | 2006224312 | 8/2006 |

OTHER PUBLICATIONS

Dainippon Ink and Chemical Co., Ltd.; SEPAREL for Jet Ink; SEPAREL PF-004D; pp. 1-2.*
EP Supplemental Search Report EP 06 83 2825, Dated May 10, 2010.

* cited by examiner

*Primary Examiner* — Matthew Luu
*Assistant Examiner* — Rut Patel
(74) *Attorney, Agent, or Firm* — Lucas & Mercanti, LLP (57) ABSTRACT

A degassing method of an ink-jet ink comprising at least a pigment, and having a viscosity of not less than 10 mPa·second and not more than 50 mPa·second at 25° C., comprising the step of: carrying out degassing employing an external refluxing type hollow fiber degassing module under a condition of a pressure loss of the hollow fiber degassing module during degassing being less than 0.1 MPa.

12 Claims, 4 Drawing Sheets

DEGASSING METHOD OF INK-JET INK, PRODUCTION METHOD OF INK-JET INK AND INK-JET PRINTER

This is a U.S. National Phase Application under 35 U.S.C. 371 of International Application PCT/JP2006/322946 filed on Nov. 17, 2006.

This application claims the priority of Japanese Application No. 2005-345472, filed Nov. 30, 2005, Japanese Application No. 2005-345473 filed on Nov. 30, 2005 and Japanese Application No. 2006-001265 filed on Jan. 6, 2006, the entire content of each of which is hereby incorporated by reference.

TECHNICAL FIELD

This invention relates to a degassing method of an ink-jet ink, a production method of the ink-jet ink, and an ink-jet printer.

BACKGROUND

Printing of an image via an ink-jet system can be performed by a method in which ink droplets are ejected from an ink-jet recording head and adhere onto a targeted recording medium. Such ink-jet system has advantages such as a relatively simple mechanism, the low sale price, and formation of high-definition and high-quality images.

Various types of ink-jet recording systems are known, and an on-demand type recording system, which has become a major leader in recent years, can be categorized as either a so-called piezo type which employs a piezoelectric element or a so-called thermal jet type. Of these, it is known that since the ink-jet recording system employing a piezo method repeatedly applies and reduces pressure to eject ink, minute bubbles tend to form due to cavitation, and the formed bubbles cause blank dots, or dots being out of register due to off-target ejected ink droplets during ejection of ink, to result in graininess which degrades the printed images.

In general, cavitation refers to a physical phenomenon in which a liquid evaporates to form a bubble when the liquid pressure, under specific temperature, becomes lower than the vapor pressure at that temperature. To cope with the adverse formation of bubbles, an employed ink-jet ink is usually subjected to a degassing treatment to reduce as much as possible the quantity of gases contained in the ink-jet ink, which prevents formation of bubbles during ink ejection. With regard to a degassing method, Patent Document 1 discloses a method of degassing via stirring a liquid in a vacuum. However, for dispersion type ink such as a pigment ink, the method exhibited rather accelerated generation of cavitation during degassing treatment since minute bubbles were generated in the liquid during degassing, which bubbles adhered to the surface of pigment particles, while the method degasses without fail solution type inks such as a dye type ink. Patent Document 2 discloses a degassing method by boiling an ink while stirring.

However, the method is not only very time consuming and requires much energy, but also exhibits the problem for pigment type ink such that the boiling treatment exerts significant influence on storage stability of the ink after the boiling treatment, since portions of the dispersed pigment ink coagulate during such boiling. Further, Patent Document 3 discloses a degassing method by feeding an ink into the interior of a gas permeable tube and by reducing air pressure or evacuating the exterior of the tube. The method can effectively degas even a pigment ink unlike either of the aforesaid two methods. However, with regard to degassing of a pigment ink exhibiting high viscosity of not less than 10 mPa·second at 25° C., applying high pressure to the ink was required, since a significant pressure loss during degassing arises when an ink is fed through a minute hollow fiber (namely a tube) having an inside diameter of several tens of microns. In this case, a high pressure applied to a pigment ink before and after the degassing treatment caused mutual coagulation among pigments, to result in exerting a significant adverse influence upon storage stability of such ink. In an extreme case, an ink immediately after exiting the hollow fiber module sometimes exhibits separation. Further, such a hollow fiber module that withstands the above-described high pressure caused problems leading to an oversized module and an increase in cost.

One possibility to decrease pressure loss during degassing might be to increase the inside diameter of the hollow fiber, but the specific surface area per volume of a module became small as the inside diameter increased, to result in a problem to have lowered production efficiency due to a significant decrease in degassing efficiency.

As described above, with regard to a pigment ink exhibiting high viscosity of not less than 10 mPa·second and not more than 50 mPa·second at 25° C., the conventional degassing methods exhibiting many problems, and specifically, large-scale production of an ink exhibited a major problem. Further, an ink-jet printer for industrial use requires incomparably higher ejection reliability than a conventional home printer. An industrial ink-jet printer uses many nozzles and high ink droplet ejection frequency to enhance productivity. Under such conditions, even a small fluctuation of ejection rate of ink-jet droplets or occurrence of a nozzle which prevents ejection of ink droplets, which leads to image defects, is not acceptable. A means to counter cavitation merely by feeding an ink degassed in advance into the ink flow channels has limits of reliability to prevent the aforesaid cavitation. Therefore, required is a recording system or a printer, in which an ink is degassed during flowing in an ink flow channels before ejection. In response to such problems, technologies of an ink-jet recording apparatus are disclosed (as described, for example, in Patent Documents 4 and 5), in which degassing is carried out in a printer by arranging an internal refluxing type hollow fiber degassing module between the ink tank and the printhead. However, even in this case, a high viscosity ink having viscosity of not less than 10 mPa·second causes a significant pressure loss in a hollow fiber degassing module during degassing, so that a large solution feeding pump is required to apply high enough pressure to the ink, resulting in problems that the printer becomes oversized and the sale price rises.

On the other hand, since an ink-jet printer features a system of ejecting minute liquid droplets from minute nozzles, to achieve a precise ink ejection, the so-called ink-jet head maintenance such as periodical discharge of an ink, wiping the nozzles of a nozzle plate, and discharge of all inks remaining in the ink channels is required to enhance reliability.

Recently, with the ongoing progress of high-speed ink-jet, the number of nozzles incorporated in one unit of a printer has been dramatically increased. Further, so-called line head printers featuring the nozzle density corresponding to a printing resolution over the total printing width has also been introduced. For example, the number of nozzles required for printing width of 600 dpi (dpi refers to a number of dots per an inch, that is, per 2.54 cm) for the long side (297 mm) of A4 size printing medium reaches 7,016 per color. With the increase in the number of nozzles, the amount of ink consumed during maintenance can no longer be ignored. Further, since such printers are mostly used in industrial applications, a reduction of printing costs is strongly demanded, and thereby, a reduction in the amount of wasted ink has been demanded.

A method is disclosed (refer to Patent Document 6) in which any ink discharged into a nozzle cap during head maintenance is recirculated to the head and is used for ejection.

Any ink discharged from a nozzle and exposed to air, as described in above Patent Document 6, is rapidly charged with ambient air. When such an ink is ejected, the above cavitation is easily generated to result in marked degraded reliability of ink ejection.

A technology is also disclosed (refer to Patent Document 7) whereby an ink is reliably ejected due to removal of bubbles from an ink channels by sufficient degassing of the ink employing a printer having an ink refluxing channels upstream of the ink-jet head, and a degassing apparatus along the circulation channels. However, during head maintenance, the ink chamber within the head is required to remove all air bubbles via ink discharge through a nozzle, resulting in the problem of any ink consumed during such maintenance to be disposed of.

Patent Document 1: Unexamined Japanese Patent Application Publication No. (hereinafter also referred to as JP-A) 6-287494
Patent Document 2: JP-A 9-59549
Patent Document 3: JP-A 5-17712
Patent Document 4: JP-A 11-42771
Patent Document 5: JP-A 11-48491
Patent Document 6: JP-A 5-330073
Patent Document 7: JP-A 11-42795

SUMMARY OF THE INVENTION

The present invention was developed in consideration of the above problems. An object of the present invention is to provide a degassing method of an ink-jet ink, a production method of the ink-jet ink, which are excellent in ink production, storage stability, ejection properties and graininess at printing, while employing a high viscosity water-based pigment ink, and to provide an ink-jet printer.

Measures to Solve the Issues

The object of the present invention can be achieved with the constitutions described below.

Item 1. A degassing method of an ink-jet ink comprising at least a pigment, and having a viscosity of not less than 10 mPa·second and not more than 50 mPa·second at 25° C., comprising the step of:

carrying out degassing employing an external refluxing type hollow fiber degassing module under a condition of a pressure loss of the aforesaid hollow fiber degassing module during degassing being less than 0.1 MPa.

Item 2. The degassing method of the ink-jet ink described in Item 1 above, wherein degassing is carried out under the condition in which the aforesaid pressure loss of the hollow fiber degassing module is less than 0.05 MPa.

Item 3. The degassing method of the ink-jet ink described in Item 1 or item 2 above, wherein the pigment contained in the aforesaid ink-jet ink is dispersed employing a dispersing agent.

Item 4. The degassing method of the ink-jet ink described in any one of Items 1-3 above, wherein the aforesaid ink-jet ink is a water-based pigment ink containing at least water and a water-soluble organic solvent.

Item 5. The degassing method of the ink-jet ink described in any one of Items 1-4 above, wherein surface tension of the aforesaid ink-jet ink is not less than 25 mN/m and not more than 38 mN/m.

Item 6. The degassing method of the ink-jet ink described in any one of Items 1-5 above, wherein an outside diameter and an inside diameter of the aforesaid hollow fiber membrane are not less than 150 μm and not more than 250 μm, and not less than 50 μm and not more than 180 μm, respectively.

Item 7. The degassing method of the ink-jet ink described in any one of Items 1-6 above, wherein a material of the aforesaid hollow fiber is 4-methylpentene-1 or fluorine resin.

Item 8. A production method of the ink-jet ink comprising a step of a degassing process using the degassing method of the ink-jet ink described in any one of Items 1-7 above.

Item 9. An ink-jet printer having an ink channel from an ink tank to a head, wherein the printer features a degassing process along the aforesaid channel using the degassing method of the ink-jet ink described in any one of Items 1-7 above.

Item 10. The ink-jet printer having an ink circulation channel for recycling any ink-jet ink, discharged from a head, into the head, wherein the printer has a degassing process along the aforesaid channel using the degassing method of the ink-jet ink described any one of Items 1-7 above.

Item 11. The ink-jet printer described in aforesaid Item 9 or Item 10, wherein the aforesaid head is a line head.

Effects of the Invention

According to the present invention, a degassing method of an ink-jet ink, a production method of the ink-jet ink, and an ink-jet printer are provided, whereby ink production, storage stability, ejection properties and graininess at printing are excellent while employing a high viscosity pigment ink.

DESCRIPTION OF NUMERIC DESIGNATIONS

1: a hollow fiber
2: an ink inlet
3: an ink outlet
4: a vacuum pump
5: an ink
6: a hollow fiber membrane

DESCRIPTION OF THE PREFERRED EMBODIMENTS

The preferred embodiments to achieve the present invention will be detailed.

The degassing method of the present invention is described with reference to the attached FIG. 1. The degassing method of the present invention is characterized in that an ink-jet ink comprising at least a pigment and exhibiting viscosity of not less than 10 mPa·second and not more than 50 mPa·second at 25° C. is degassed under conditions that an external refluxing type hollow fiber degassing module is employed, and pressure loss of the hollow fiber degassing module during degassing is less than 0.1 MPa.

External Refluxing Type Hollow Fiber Degassing Module

Figure 1:
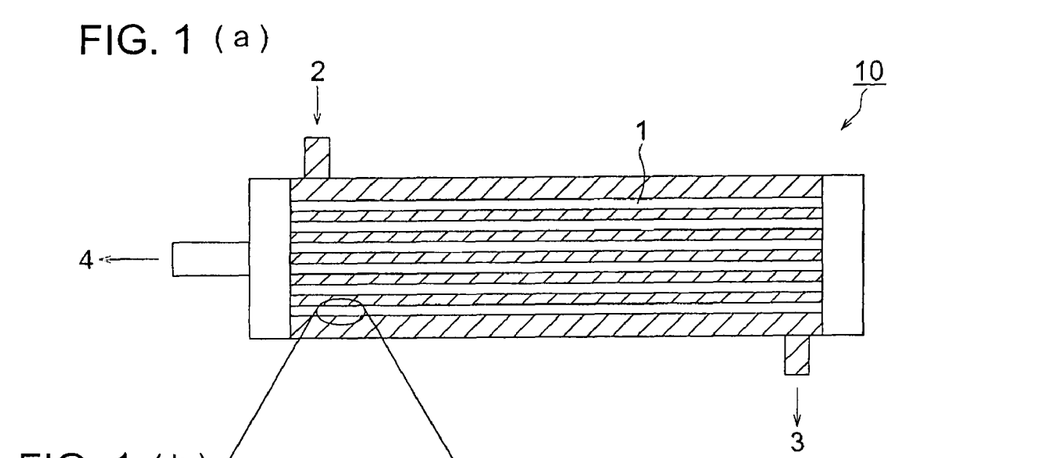
FIG. 1a-1c: cross-sectional views of a constitution of a degassing module

A degassing module 10, employs a hollow fiber of an external refluxing type which is used in the degassing method of the present invention, and features the constitution as shown in FIG. 1.

A degassing is carried out in such a manner that an ink 5 as shown in FIG. 1-a is fed from an ink inlet 2 into the exterior of a hollow fiber and the interior of the hollow fiber 1 is decompressed and evacuated. It is possible to carry out degassing while keeping a small pressure loss, and without a decrease in efficiency by allowing an ink of high viscosity to flow through a wide channel and allowing the interior of the thin hollow fiber to be decompressed and evacuated, resulting in efficient degassing without deteriorating dispersion stability of the pigment ink. In FIG. 1-a, numeral 3 denotes an ink outlet while numeral 4 is a vacuum pump. For such an external refluxing type hollow fiber degassing module, a commercial product is usable, and examples include SEPAREL EF-002A-P and SEPAREL EF-004P (produced by Dainippon Ink and Chemicals Inc.). FIG. 1-b schematically shows migration of dissolved air through a hollow fiber membrane 6 into a hollow fiber 1 which is decompressed. FIG. 1-c schematically shows cross sections of length direction of three hollow fibers.

On the other hand, a widely used conventional degassing module of a hollow fiber type is called an internal refluxing type hollow fiber degassing module, in which degassing is carried out by feeding an ink into the interior of the hollow fiber having an inside diameter from 100 μm to 200 μm, and the exterior of the hollow fiber is decompressed and evacuated. When a pigment ink exhibiting a viscosity of not less than 10 mPa·second and not more than 50 mPa·second was degassed employing the internal refluxing type hollow fiber degassing module, a phenomenon arose in which ink storage stability was remarkably decreased compared to that before having been subjected to degassing.

The inventors found that when a high pressure was applied to a pigment ink before and after degassing, the pigments caused a mutual coagulation to result in a remarkable harmful influence on storage stability and ejection stability of the ink. Such coagulation is not caused by simple application of pressure on an ink, but is caused when pressure is applied to an ink on the degassing membrane, however a sufficient analysis of the cause has not been carried out. Further, it was found that the threshold pressure to cause coagulation, which depends somewhat on ink types, was about 0.2 MPa. The above finding indicates that pressure loss of a hollow fiber degassing module is required to be less than 0.1 MPa, while degassing operation at less than 0.05 MPa is more preferred.

The term "pressure loss" of a hollow fiber degassing module during degassing, as used in the present invention, refers to pressure applied to an inlet of the hollow fiber degassing module, and may be determined via a pressure gauge arranged upstream of the hollow fiber degassing module.

As described above, the inventors found out that employing an external refluxing type hollow fiber degassing module is most preferable for a method in which degassing is carried out under a condition of low pressure loss of a hollow fiber degassing module during degassing, without lowering production efficiency or degrading ink properties, leading to the present invention.

In FIG. 1-c, the outside diameter 61 and the inside diameter 62 are preferably not less than 150 μm and not more than 250 μm, and not less than 50 μm and not more than 180 μm, respectively. The hollow fiber having the outside diameter 61 of less than 150 μm is difficult to make considering sufficient strength. In the case where the outside diameter of the hollow fiber exceeds 250 μm, specific surface area of the hollow fiber becomes too small, resulting in a decrease in degassing efficiency. In the case where the inside diameter is less than 50 μm, degassing efficiency decreases. On the other hand, in the case where the inside diameter exceeds 180 μm, the hollow fiber is difficult to make considering sufficient strength. It is preferable that a thickness of the wall of the hollow fiber is not less than 30 μm from the viewpoint of strength. Here, the term "diameter" as used in this invention refers to a diameter when the shape of the cross-section of the hollow fiber is circular, and a converted diameter in which the cross-section area thereof is converted to a circle having the same area when the shape thereof is not circular. The "diameter" may be determined via observation of the cross-section employing an electron microscope.

FIG. 1-c illustrates only three hollow fibers for convenience, but the external refluxing type hollow fiber degassing module of the present embodiment has, as shown in FIG. 1-a, a constitution in which numerous hollow fibers are arranged. The number of the hollow fiber can be any appropriate number, and is not specifically limited to the present embodiments. In the case where the module has a plurality of hollow fibers, it is preferable that the inside and the outside diameters of any hollow fibers are within the above-described ranges.

Various materials are usable for the aforesaid hollow fiber. Specifically, it was found that poly-4-methylpentene-1 resin or polytetrafluoroethylene resin did not easily degrade in degassing capability even if a large amount of ink was treated, and did not easily allow surfactants or dispersing agents incorporated in an ink to adhere to the exterior of the hollow fibers, to result in an ink component which hardly ever changes.

It is possible to determine the degree of degassing of the present invention by determining the concentration of dissolved oxygen. The determination method of the concentration of dissolved oxygen includes, for example, the Ostwald method (refer to page 241 of Jikken Kagaku Koza (Experimental Chemistry Lectures) 1 Kihon Sosa (Basic Operations) [1], 1975, Maruzen), a method employing mass spectrometry, methods employing simple oxygen meters such as a galvanic cell type or polarography type, or calorimetric analysis. The concentration of dissolved oxygen may also be simply and easily determined via a commercially available dissolved oxygen meter (such as Type DO-30A: produced by Toa Denpa Kogyo, Ltd.)

The degree of degassing of the present invention is preferably not more than 4 ppm in terms of concentration of dissolved oxygen, and more preferably not more than 2 ppm considering prevention of generation of cavitation and graininess at printing.

An ink which is degassed via the degassing method of the present invention may within reason be any type of ink as long as the ink is a pigment ink comprising at least a pigment, and the viscosity thereof is not less than 10 mPa·second and not more than 50 mPa·second at 25° C. It is preferable that the ink is a water-based pigment ink comprising at least water, a pigment, and a water-soluble organic solvent. The water-based ink remarkably exhibits the targeted effects of the present invention, since a particularly precise degassing is required for an ink ejection.

A UV radiation curable pigment ink may also be preferably used for the pigment ink of the present invention.

Examples of cationic polymerization types of a UV radiation curable pigment ink are listed below.

A cationic polymerizable composition of the present invention incorporates at least a cationic polymerizable compound and a cationic polymerization initiator.

Cationic polymerizable compounds usable in the present invention include, for example, but are not limited to, cationic polymerizable vinyl compounds, lactones, and cyclic ethers. Cationic polymerizable vinyl compounds include styrene and vinyl ether. Cyclic ethers include spiroorthoesters, bicycloorthoesters, and cyclic carbonates, as well as epoxy compounds and oxetane compounds.

Epoxy compounds usable in the present invention denote compounds having an oxirane group which is a three-membered ring represented by the following formula (1), and include aromatic epoxy compounds and cycloaliphatic epoxy compounds.

formula (1)

Oxetane compounds usable in the present invention denote compounds having an oxetane ring which is a four-membered ring ether represented by the following formula (2).

formula (2)

In the cationic polymerizable composition of the present invention, preferable cationic polymerizable compounds are cyclic ethers which perform ring opening polymerization by an action of cation, and more preferably cycloaliphatic epoxiy compounds and oxetane compounds. It is particularly preferable to use cycloaliphatic epoxy compounds and oxetane compounds in a mixed state, since the mixture exhibits excellent curability. In this case, the mixing ratio of a cycloaliphatic epoxy compound and an oxetane compound (cycloaliphatic epoxy compound/oxetane compound) is typically 5/95-95/5 by mass, and preferably 10/90-70/30 by mass. An excessively low amount of the oxetane compound in the mixture tends to result in deteriorated flexibility and solvent resistance of cured products. On the other hand, an excessively high amount of oxetane compound in the mixture causes inferior curing under high humidity conditions.

In the cationic polymerizable composition of the present invention, preferable examples of oxetane compounds include 3-ethyl-3-hydroxymethyl oxetane, 1,4-bis[(3-ethyl-3-oxetanyl)methoxymethyl]benzene, 3-ethyl-3-(phenoxymethyl)oxetane, 3-ethyl-3-(2-ethylhexyloxymethyl)oxetane, and di(1-ethyl-3-oxetanyl)methyl ether.

Preferable examples of cycloaliphatic epoxy compounds include cycloaliphatic epoxy resins such as 3,4-epoxy cyclohexylmethyl 3',4'-epoxy cyclohexane carboxylate (e.g. commercially available under the trade names of UVR 6105, UVR 6110 and CELOXIDE 2021), bis(3,4-epoxy cyclohexylmethyl)adipate (e.g. commercially available under the trade name of UVR 6128), vinylcyclohexenemonoepoxide (e.g. commercially available under the trade name of CELOXIDE 2000), epsilon caprolactone modified 3,4-epoxy cyclohexylmethyl 3',4'-epoxy cyclohexane carboxylate (e.g. commercially available under the trade name of CELOXIDE 2081), and 1-methyl-4-(2-methyloxylanyl)-7-oxabicyclo[4,1,0]heptane (e.g. commercially available under the trade name of CELOXIDE 3000). The above commercial products having the trade names of UVR 6105, UVR 6110 and UVR 6128 are available from Union Carbide Corp. While the above commercial products having the trade names of CELOXIDE 2000, CELOXIDE 2021, CELOXIDE 2081, and CELOXIDE 3000 are available from Daicel Chemical Industries, Ltd. UVR 6105 is a low-viscosity type of UVR 6110.

Other specific examples of the cationic polymerizable compounds are described in further detail in JP-A No. 8-143806, JP-A No. 8-283320, JP-A No. 2000-186079 and JP-A No. 2000-327672, and any compound appropriately selected from the exemplified ones thereof is usable.

Cationic polymerization initiators usable in the present invention include diaryliodonium salts and triarylsulfonium salts, as well as commonly known sulfonium salts and ammonium salts, and any compound appropriately selected from those described, for example, in JP-A No. 8-143806 and JP-A No. 8-283320 is usable. Commercially available cationic polymerization initiators are also usable as they are, and representatives thereof include, for examples, commercially available ones under the trade names of CI-1370, CI-2064, CI-2397, CI-2624, CI-2639, CI-2734, CI-2758, CI-2823, CI-2855 and CI-5102 (all produced by Nippon Soda Co., Ltd.), commercially available under the trade name of PHOTOINITIATOR 2047 (produced by Rhodia Co.), and commercially available under the trade names of UVI-6974 and UVI-6990 (produced by Union Carbide Corp.).

The amount of the cationic polymerization initiator used in the cationic polymerization composition of the present invention varies depending on the initiator, the cationic polymerization compound and the ratio thereof, and conditions of use. In practice, the amount thereof is normally 0.1-20 parts by mass, preferably 1-10 parts by mass, and more preferably 3-5 parts by mass to 100 parts by mass of the cationic polymerization compound contained in the cationic polymerization composition. In case where the amount of the cationic polymerization initiator exceeds the above ranges, storage stability tends to deteriorate while the polymerization rapidly proceeds, and on the other hand, in case where the amount is less than the above range, curability suffers.

The present invention is characterized in that the total amount of cationic impurities, metal impurities and highly acidic substances contained in the cationic polymerization composition is not more than 500 ppm, and preferably not more than 100 ppm, including zero ppm.

The above impurities are brought into the cationic polymerization composition during the preparation thereof from the cationic polymerization compounds, the cationic polymerization initiators, or other additives. The total amount of the above-described impurities exceeding 500 ppm deteriorates storage stability.

The above-described cationic impurities or metal impurities include B, F, Na, Mg, Al, P, S, Cl, K, Ca, Cu, Br, Ag, Sn, As, and W.

The aforesaid highly acidic substances include, for example, sulfuric acid, hydrochloric acid, nitric acid, phosphoric acid, p-toluenesulfonic acid, benzenesulfonic acid, naphthalenesulfonic acid, metasulfonic acid, methanesulfonic acid, ethanesulfonic acid, trifluoromethanesulfonic acid, $AlCl_3$, $AlBr_3$, $FeCl_3$, $BCl_3$, $BBr_3$, $BF_3.OEt_2$, $BF_3$, $SbF_5$, $PF_5$, $ZnCl_2$, and $TiCl_4$.

In the present invention, the cationic polymerization composition in which the total amount of cationic impurity, metal impurity, and highly acidic substance is not more than 500 ppm may be obtained in such a manner that any one of the cationic polymerization compound, the cationic polymerization initiator, or the cationic polymerization composition is subjected to means of separation and purification such as absorption using a basic absorbing agent, column chromatography (for example, silica-gel column chromatography), an activated carbon treatment, crystallization, or recrystallization.

Specifically, it is preferable that the highly acidic substance is subjected to a separation treatment by, of the above means for purification, absorption treatment using a basic absorbing agent or column chromatography. Usable examples of basic absorbing agents include a basic inorganic absorbent (e.g., hydrotalcite) such as "Kyoward" (a trade name). The appropriate amount of the basic absorbent to be used is selected based on the highly acidic substance used or the content thereof, and is normally about 1-20 parts by mass to 100 parts by mass of the compound to be treated. Absorption treatment using the aforesaid basic absorbent is carried out by dissolving the compound to be treated into an appropriate solvent. The treatment is carried out at a temperature of, for example, 10-100° C. The treatment may be carried out via conventional methods such as a batch method, a continuous method, a fluidized bed method, or a packed column method.

The content of such impurities may be determined via commonly known analytical methods such as high-speed liquid chromatography, gas chromatography, elemental analysis, atomic absorption analysis, an infrared absorption spectrum method, an NMR spectrum method, mass spectrometry and titration analysis.

The water content of a cationic polymerizable composition of the present invention varies depending on the type of the cationic polymerizable compound and the content ratio thereof, the type of cationic polymerization initiator and its content ratio, storage conditions, or curing conditions. The water content is preferably not less than 1% by mass to the total mass of the cationic polymerizable composition, and more preferably not less than 2% by mass. A shortage in water content may not sufficiently enhance the storage stability of the cationic polymerizable compound.

The present invention does not necessarily prevent adding excessive water to the cationic polymerizable composition. However, it is preferable that the water is dissolved in the cationic polymerizable compound. Therefore, the maximum amount of the water content is normally determined by the amount of water dissolvable in the cationic polymerizable composition. Practically the maximum amount is usually, but not specifically, not more than 10% by mass, preferably not more than 6% by mass, and more preferably not more than 4% by mass of the cationic polymerizable composition. The amount of water to be added is determined considering an amount of water loss due to evaporation thereof or other factors during, for example, storage and curing treatment. Excessive water content requires a longer time for curing the cationic polymerizable compound, and may cause water being separated under low temperature conditions.

In the present invention, it is preferable that the cationic polymerizable compound incorporates a water evaporation inhibitor. The amount of water contained in the cationic polymerizable compound decreases by evaporation during in storage, and as a result, storage stability of the cationic polymerizable compound tends to decrease with time. However, since addition of a water evaporation inhibitor prevents water in the cationic polymerizable compound from evaporating, good storage stability thereof is allowed to continue over a long period of time. The use of a water evaporation inhibitor is preferable not only in a case where the cationic polymerizable compound is stored at hermetically sealed conditions, but especially preferable in a case where something such as an ink vehicle is stored at open containers. The water evaporation inhibitors usable in the present invention include, for example, ethylene glycol, triethylene glycol, dipropylene glycol, butylene glycol, polyethylene glycol (having molecular weight of 200-600), glycerin, sorbitol, sodium lactate, sodium 2-prrolidone-5-carboxylate, sodium hyaluronate, and other compounds having a moisturizing effect such as alcohols, saccharides, and glycolethers.

The amount of a water evaporation inhibitor to be used in the present invention is appropriately controlled by a cationic polymerizable compound, a water evaporation inhibitor, storage conditions, and the desired storage period. The amount is usually 10-200% by mass of the water contained in the cationic polymerizable composition, and preferably 50-100% by mass.

Appropriate viscosity of the cationic polymerizable composition of the present invention may be controlled by selecting the most desirable molecular weight of cationic polymerizable compounds, or a combination thereof, according to the use of the cationic polymerizable composition. In a special case where the cationic polymerizable composition of the present invention is employed as a vehicle for an ultraviolet curable ink used for an office ink-jet printer, the viscosity is typically regulated to 5-50 mPa·second, and preferably 10-30 mPa·second at 23° C.

The cationic polymerizable composition of the present invention is allowed to initiate a polymerization reaction to affect ink curing, as in conventional ways, by irradiation of active energy rays such as ultraviolet rays, X rays, electron beams or by heating. The cationic polymerizable composition of the present invention may be added, if needed, as various additives such as a pigment, a dye, a sensitizer, a flame retardant, and an antistatic agent. The resultant composition is suitably used, for example, as an ink, a vehicle, a glazing varnish, a coating material, an adhesive, a prepreg, a sealing material, a laminated plate, and a forming material.

Surface tension of the ink which is degassed employing the degassing method of the present invention may be any value, but is preferably 25-38 mN/m at 25° C., more preferably 25-35 mN/m, and most preferably 30-35 mN/m.

Pigments usable in an ink to be degassed by the degassing method of the present invention include those commonly known without any limitation, and either water-dispersible pigments or oil-dispersible pigments are usable.

For example, organic pigments such as insoluble pigments or lake pigments, as well as inorganic pigments such as carbon black are preferably usable. The pigments are allowed to be present as a dispersed state in water-soluble inks. As a dispersion method of the pigments, any one of self-dispersion, dispersion employing a surfactant, polymer dispersion and microcapsule dispersion is applicable, but polymer dispersion or microcapsule dispersion is preferable in terms of fixability.

Examples of preferable insoluble pigments, but not particularly limited to these, include azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, diketopyrrolopyrrole.

Specific pigments which are preferably usable are listed below.

Examples of pigments for magenta or red include: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of pigments for orange or yellow include: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

Examples of pigments for green or cyan include: C.I. Pigment Blue 15, C.I. Pigment Blue 15:2, C.I. Pigment Blue 15:3, C.I. Pigment Blue 16, C.I. Pigment Blue 60, C.I. and C.I. Pigment Green 7.

Further examples of pigments for black include: C.I. Pigment Black 1, C.I. Pigment Black 6, and C.I. Pigment Black 7.

The average particle diameter of pigments in a dispersed state incorporated in an ink to be degassed by the degassing method of the present invention is preferably not less than 50 nm and less than 200 nm. When the average particle diameter of the pigment dispersion is less than 50 nm or not less than 200 nm, the pigment dispersion becomes unstable, whereby storage stability of the ink is easily decreased.

The average particle diameter can be determined employing commercially available particle diameter measuring apparatuses using a dynamic light scattering method or an electrophoretic method. Of these, a dynamic light scattering method is frequently used for the measurements since the operation of the method is simple and accuracy of the measurement is high in the range of the particle diameter.

Dispersion Method and Dispersing Agent

It is preferable that pigments used in an ink to be degassed via the degassing method of the present invention are dispersed employing a homogenizer, together with dispersing agents and necessary additives for varying desired purposes. Commonly known homogenizers are usable, including a ball mill, a sand mill, a line mill or a high pressure homogenizer. Of these, dispersion using a sand mill is preferable since a sharp distribution of particle diameter is thereby achievable. As bead materials used for sand mill dispersion, zirconia or zircon is preferable considering possible contamination of bead fragments or ionic constituents. A bead diameter of 0.3-3 mm is preferable.

In an ink to be degassed via the degassing method of the present invention, a high molecular weight dispersing agent is preferably used.

The term "high molecular weight dispersing agent" in the present invention means that a high molecular weight component thereof has a molecular weight of not less than 5,000 and not more than 200,000. The high molecular weight dispersing agents include block copolymers, random copolymers, or salts thereof which comprise at least two monomers selected from styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives. Further listed are polyoxyalkylene, and polyoxyalkylenealkylether.

An acidic high molecular weight dispersing agent is preferably added after having been neutralized via a neutralizing base. The neutralizing bases preferably include, but are not limited to, an organic base such as ammonia, monoethanolamione, diethanolamione, triethanolamione, and morpholine.

In the present invention, the pigment dispersing agent is preferably employed at 10-100% by mass of the pigment.

Usable Solvent

The water-soluble organic solvents preferably usable in the present invention include, for example, alcohols (e.g., methanol, ethanol, propanol, isopropanol, butanol, isobutanol, secondary butanol, tertiary butanol, pentanol, hexanol, cyclohexanol, benzyl alcohol), polyvalent alcohols (e.g., ethyleneglycol, diethyleneglycol, triethyleneglycol, polyethyleneglycol, propyleneglycol, dipropyleneglycol, polypropyleneglycol, butyleneglycol, hexanediol, pentanediol, glycerin, hexanetriol, thiodiglycol, 1,3-propanediol, 1,4-butanediol, 1,5-pentanediol, 1,2-pentanediol, 1,2-hexanediol, 1,2,6-hexanetriol), polyvalent alcohol alkyl ethers, amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine), amides (e.g., formamide, N—N-dimethylformamide, N,N-dimethylacetamide), heterocycles (e.g., 2-pyrrolidone, N-methyl-2-pyrrolidone, cyclohexylpyrrolidone, 2-oxazolidone), sulfoxides (e.g., dimethylsulfoxide), sulfones (e.g., sulforane), urea, acetonitrile, and acetone.

In the ink to be degassed via the degassing method of the present invention, it is preferable that a solvent composition is such that, of the water-soluble organic solvents, a solvent whose content in the ink is the majority of all the solvents has an SP value of not less than 16.5 and less than 24.6, and the content of the water-soluble organic solvent having the above SP value of not less than 16.5 and less than 24.6 is not less than 30% by mass of the ink. Since the ink having the above solvent composition contains water-soluble organic solvents in large amounts, the solubility of the entire ink is high, resulting in less likely generation of cavitation during continuous ejection.

The term "solubility parameter of solvent (SP value)" of the present invention refers to a value indicated by the square root of the molecular cohesion energy, and is determined via a method described in "R. F. Fedors, Polymer Engineering Science, 14, p. 147 (1974)". The unit thereof is $(MPa)^{1/2}$, and the value is determined at 25° C.

Examples of the water-soluble organic solvents whose SP values fall under not less than 16.5 and less than 24.6 are listed below together with a SP values in parenthesis. Of course, the present invention is not limited to them.

ethylene glycol monomethyl ether (24.5)
ethylene glycol monoethyl ether (23.5)
ethylene glycol monobutyl ether (22.1)
ethylene glycol monoisopropyl ether (22.3)
diethylene glycol monomethyl ether (23.0)
diethylene glycol monoethyl ether (22.4)
diethylene glycol monobutyl ether (21.5)
diethylene glycol diethyl ether (16.8)
triethylene glycol monomethyl ether (22.1)
triethylene glycol monoethyl ether (21.7)
triethylene glycol monobutyl ether (21.1)
propylene glycol monomethyl ether (23.0)
propylene glycol monophenyl ether (24.2)
dipropylene glycol monomethyl ether (21.3)
tripropylene glycol monomethyl ether (20.4)

3-dimethyl-2-imidazolizinone (21.8)

Various Additives

In response to purposes to enhance various properties such as ejection consistency, printing head and ink cartridge compatibility, storage stability, and image stability, in the ink to be degassed by the degassing method of the present invention, usable are any additives appropriately selected from various commonly known ones such as polysaccharides, viscosity modifiers, specific resistance controlling agents, film forming agents, UV absorbers, antioxidants, anti-discoloring agents, antiseptic agents, or anti-rusting agents, other than those described above, if needed. Examples of the additives include minute oil droplets of liquid paraffin, dioctyl phthalate, tricresyl phosphate, or silicone oil; UV absorbers described in JP-A Nos. 57-74193, 57-87988, and 62-261476; anti-discoloring agents described in JP-A Nos. 57-74192, 57-87989, 60-72785, 61-146591, 1-95091, and 3-13376, as well as optical brightening agents described in JP-A Nos. 59-42993, 59-52689, 62-280069, 61-242871, and 4-219266.

The above-described embodiments are examples of the degassing method of the ink-jet ink of the present invention.

Subsequently, embodiments of production of an ink-jet ink having a degassing process employing the degassing method of the present invention is described below.

Figure 2:
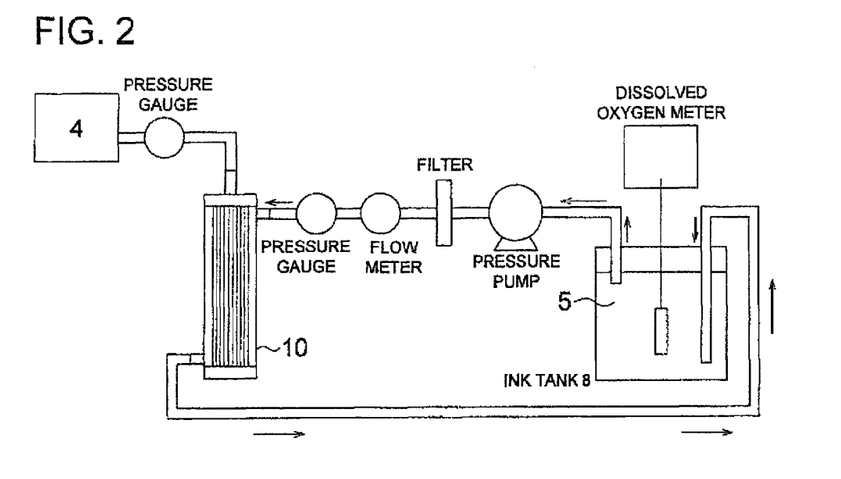
FIG. 2: a schematic view of a degassing module during degassing

A typical arrangement of degassing apparatuses is shown in FIG. 2. The basic arrangement is that a pressure pump (that is, a solution feeding pump) is arranged upstream of the degassing module 10 which is shown in FIG. 1, and a vacuum pump 4 is connected to the interior of a hollow fiber. It is preferable that a filter is provided either upstream or downstream of the degassing module or both of them. A metal filter is preferably used so that the filter can be washed.

Considering production efficiency, a single-path degassing process is preferable whereby degassing is carried out by allowing only one passage of the ink 5 in the ink tank through the degassing module. However, it is also possible to carry out methods in which degassing is carried out by arranging two sets of degassing modules, or the ink is allowed to pass through a plurality times the same module, or further the ink is allowed to circulate within the same module until the ink reaches the targeted degassed level.

According to the method of an ink-jet ink having a degassing process employing a degassing method of the ink-jet ink of the present invention, a production method of an ink-jet ink is provided, whereby ink productivity, storage stability, ejection properties, and graininess at printing are excellent, while employing a high viscosity pigment ink.

Next, several preferred embodiments of an ink-jet printer having a degassing process employing a degassing method on an ink-jet ink of the present invention are described below.

The production method of an ink stored in the ink tank employed in the present embodiments is, but is not limited to, preferably an ink produced by the production method of an ink-jet ink as described in the above-described embodiments. An ink-jet printer is described below wherein an ink-jet printer incorporating an ink channel from an ink tank to a head (namely an ink-jet head) features a degassing process along the above-described ink channel employing the degassing method of the present invention.

Though the degassing module may, within reason, be provided anywhere as long as it is between the ink tank and the head, the module is preferably provided as close to the head as possible, since the ink channel has many air entry points such as small diameter resin pipes and joints. An example of a constitution from an ink tank to a head is shown in FIG. 3, but the constitution of the present invention is not limited to this example.

Figure 3:
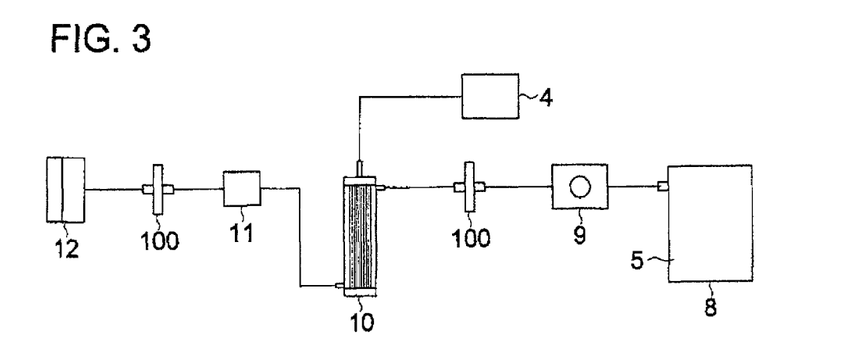
FIG. 3: an example of a constitution from an ink tank to a head of the present invention

As shown in FIG. 3, an ink 5 filled up in an ink tank 8 is fed by a solution feeding pump 9 to a head 12, during which the ink 5 is fed through a filter 100 to the hollow fiber degassing module which is shown in FIG. 1 and connected to a vacuum pump 4, where it is degassed in the module employing the degassing method of the above-mentioned present invention, the pressure of the ink is regulated via a back-pressure regulator 11, and finally, the ink reaches the head 12 after passing through a filter 100.

"The ink tank of the present invention" refers to an ink storage means, and in the case where an ink is fed from a bottle and only a liquid is supplied to the head, the ink tank refers to the reserve tank thereof. Further, in the case where an ink is fed from an ink cartridge or a bottle and the cartridge or the bottle itself also serves as an ink tank, the ink tank refers to the cartridge or the bottle. According to the ink-jet printer having a degassing process along an ink channel employing the degassing method of an ink-jet ink of the above-mentioned present invention, an ink-jet printer is provided, whereby ejection consistency is excellent and the printer is suitable for industrial printing use.

Subsequently, an ink-jet printer is described below, wherein an ink-jet printer, featuring an ink circulation channel by which an ink-jet ink discharged from a head is allowed to return to the head, features a degassing process along the above ink circulation channel employing the above-mentioned degassing method of an ink-jet ink.

Figure 4:
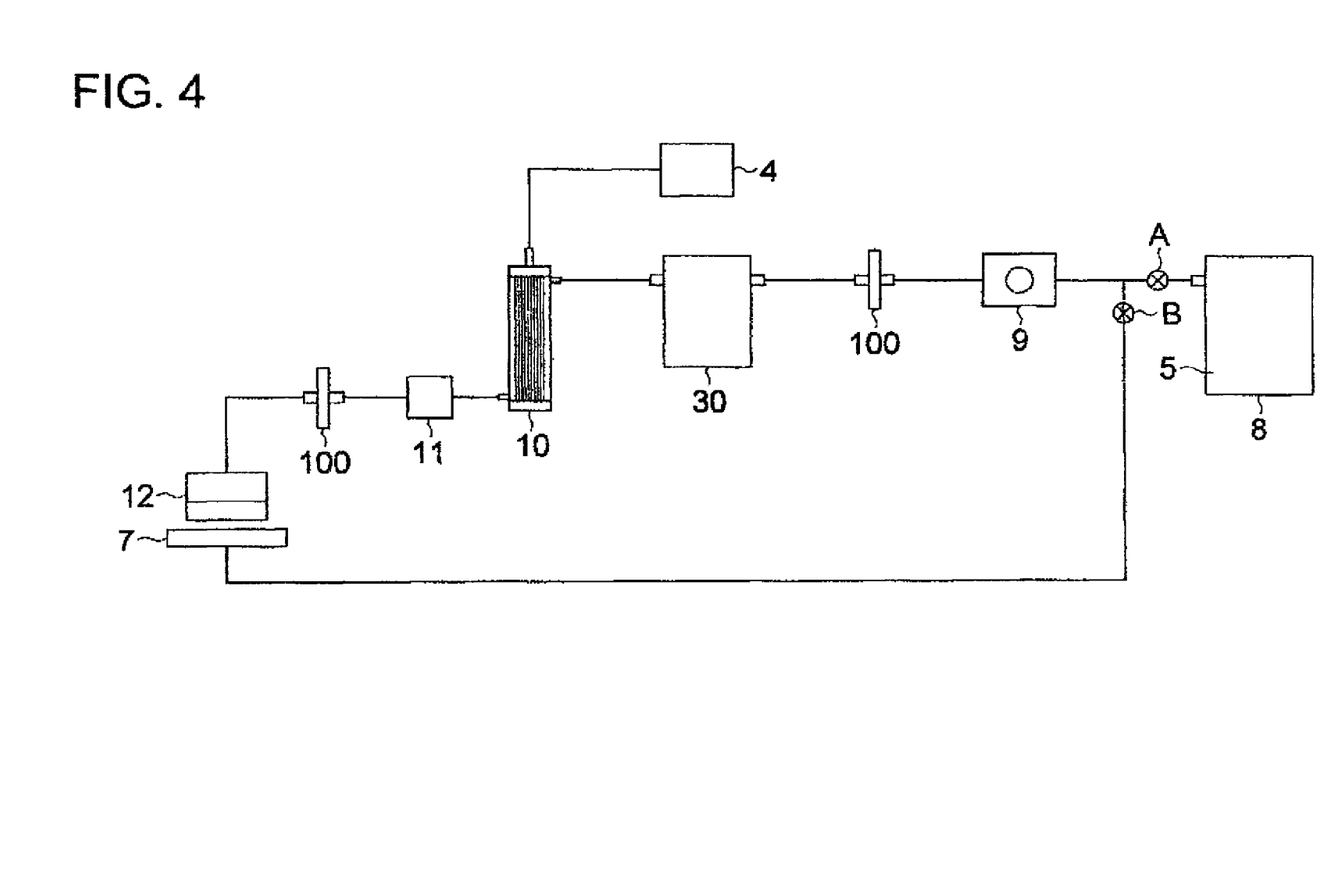
FIG. 4: an example of a schematic drawing of an ink circulation channel of the present invention

An example of a constitution of the ink circulation channel is shown in FIG. 4, but, as a matter of course, the present invention is not limited to the example. To introduce the ink 5 into the head 12, with the electromagnetic valve A being opened and the electromagnetic valve B being closed, an ink is fed from the ink tank 8 to fill the head 12 passing through the filter 100, the intermediate tank 30, the back pressure regulator 11, and the filter 100. During the above process, dissolved air in the ink 5 is removed via the degassing module 10 shown in FIG. 1, which is provided along the above circulation channel and connected to the vacuum pump 4. During head maintenance, the head cap 7 is contacted the head 12, and then the interior of the cap is decompressed by the solution feeding pump 9, to result in the ink in the head 12 being drawn out, or the ink being ejected from the head 12 to the head cap 7. At that time, by the electromagnetic valve A being closed and the electromagnetic valve B being opened simultaneously, the ink in the head cap is, after being degassed again by the degassing module 10, sent to the head 12, and is available again for ejection.

In the above example, FIG. 4 shows an example of ink circulation starting from a head cap, but the starting of the aforesaid circulation is not limited to being only from the head, so that circulation starting from a shared ink chamber at a head or a gutter of discharged ink is also applicable.

Though the degassing module may, within reason, be provided anywhere as long as it is between the ink tank and the head, the module is preferably provided as close to the head as possible, since the ink channel has many air entry points such as small diameter resin pipes and joints. In an ink-jet printer having an ink circulation channel whereby an ink-jet ink discharged from the head of the present invention is allowed to return to the head, an ink-jet printer having a degassing process along the above ink circulation channel employing the degassing method of the aforesaid ink-jet ink can achieve ink-jet recordings of excellent ejection consistency, enhanced reliability, and in which the amount of waste ink which is not used for a recording is reduced optimally. The present invention is particularly suitable for industry printing use.

Figure 5:
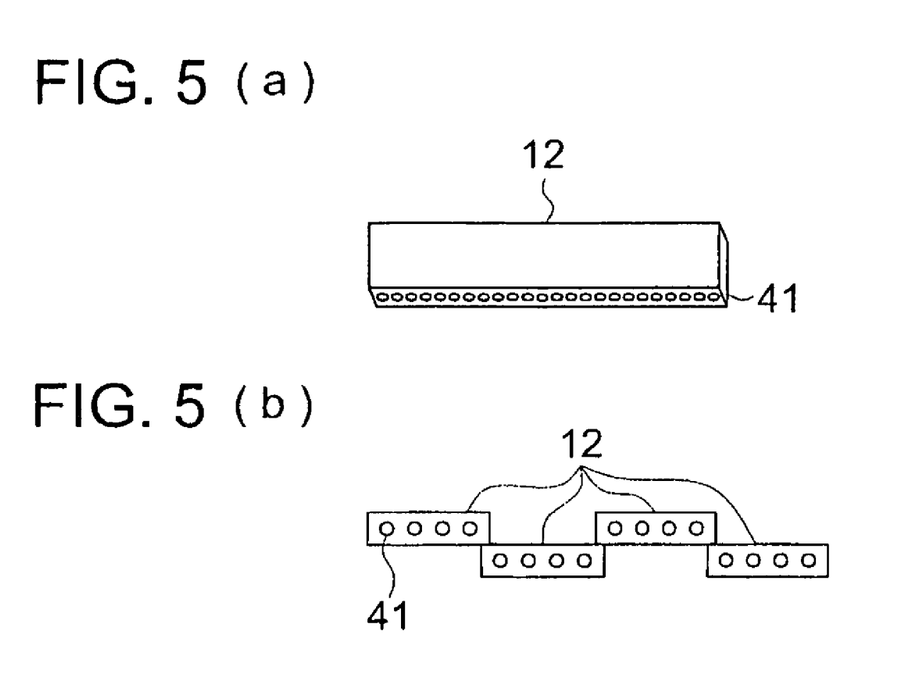
FIG. 5a-5b: schematic views showing examples of various head configurations.

Several example configurations of the head 12 in the above embodiment are shown in FIG. 5, but are not particularly limited thereto.

In addition to a single head 12 which features a plurality of nozzles 41 as shown in FIG. 5-a, a head unit is usable in which a plurality of heads 12 are joined in the direction of a nozzle arrangement to constitute as one head as shown in FIG. 5-b. In case of the above-described line head, the configuration of FIG. 5-b is particularly beneficial.

EXAMPLES

The invention is described below with reference to examples, but the invention is not limited to them. Descriptions of "parts" in examples denote "parts by mass".

Example 1

[Preparation of Ink 1]

According to the formula of dispersion below, a pigment, a water-based solvent, and a high molecular weight dispersing agent were weighed and blended, and the total mass of the mixture was adjusted to 100 parts with deionized water. The resultant solution was initially mixed with a dissolver, and the mixed solution was subjected to dispersion via a bead mill (for example, MiniCer, produced by Ashizawa Finetech Ltd.) filled with 340 g of zirconia beads to prepare a Pigment Dispersion 1.

| <Pigment Dispersion 1> | |
|---|---|
| C.I. Pigment Blue 15:3 | 15 parts |
| JONCRYL 61J (produced by Johnson Polymer Co.) (solid contents) | 6 parts |
| glycerin | 20 parts |

Subsequently, based on the formula of an ink below, each component was weighed and blended, followed by filtration of the mixture employing a #1000 mesh metal filter to prepare an Ink 1.

| <Ink 1> | |
|---|---|
| Pigment Dispersion 1 | 20 parts |
| ethylene glycol | 20 parts |
| glycerin | 15 parts |
| triethyleneglycolmonobutylether | 5 parts |
| OLFINE E1010 (produced by Nissin Chemical Industry Co., Ltd.) | 0.6 part |
| deionized water | 39.4 parts |

<Preparation of Inks 2-4>

Below, each pigment dispersion and each ink were prepared in a similar manner to the preparation of Ink 1 except for composition of additives.

| <Pigment Dispersion 2> | |
|---|---|
| carbon black: Mitsubishi MA100 | 15 Parts |
| BYK 190 (Big Chemie Corp.) (solid contents) | 6 parts |
| dipropyleneglycolmonomethylether | 20 parts |

| <Ink 2> | |
|---|---|
| Pigment Dispersion 2 | 20 parts |
| dipropyleneglycolmonomethylether | 54 parts |
| deionized water | 26 parts |

| <Pigment Dispersion 3> | |
|---|---|
| C.I. Pigment Red 122 | 20 parts |
| JONCRYL 501 (solid contents) | 8 parts |
| tripropyleneglycolmonomethylether | 20 parts |

| <Ink 3> | |
|---|---|
| Pigment Dispersion 3 | 25 parts |
| tripropyleneglycolmonomethylether | 65 parts |
| deionized water | 10 parts |

| <Pigment Dispersion 4> | |
|---|---|
| carbon black: Mitsubishi MA7 | 15 Parts |
| JONCRYL 70 (solid contents) | 6 parts |
| glycerin | 20 parts |

| <Ink 4> | |
|---|---|
| Pigment Dispersion 4 | 20 parts |
| glycerin | 34 parts |
| tripropyleneglycolmonomethylether | 5 parts |
| OLFINE E1010 | 0.6 part |
| deionized water | 40.4 parts |

<Preparation of Ink 5>

A mixture of 2.5 parts of a pigment P1, produced beforehand, 3 parts of a dispersing agent (Solsperse 32000: produced by Avecia Co.), 21.45 parts of an epoxy compound (CEL2021P: produced by Daicel Chemical Industries, Ltd.), and 63 parts of an oxetane compound (OXT221: produced by TOAGOSEI Co., Ltd.), was dispersed employing a sand mill over 4 hours to prepare an undiluted ink. Subsequently, 10 parts of a cationic polymerization initiator S1 was added to the undiluted ink, and the resulting solution was gently stirred, followed by being subjected to pressured filtration employing a membrane filter to prepare an Ink 5, which is an active energy ray curable ink-jet ink.

<Preparation of Ink 6>

An Ink 6 was prepared in a similar manner to the preparation of the undiluted ink for an Ink 5 except for addition of 0.05 part of triethanolamine.

Structure of Polymerization Initiator S1

[Degassing]

Each Ink 1-6 was subjected to the following degassing treatments (A) and (B) employing apparatuses which were arranged as illustrated in the aforesaid FIG. 2.

(A): An internal refluxing type hollow fiber degassing module: degassing to less than 1 ppm was performed employing SEPAREL PF-001D (produced by Dainippon Ink and Chemicals, Inc.).

(B): An external refluxing type hollow fiber degassing module: degassing to less than 1 ppm was performed employing SEPAREL EF-002A-P (produced by Dainippon Ink and Chemicals, Inc.).

[Evaluation Following Centrifugation]

Each ink was subjected to centrifugation under the following conditions before and after the aforesaid degassing, and after that, the supernatant liquid and precipitation in each ink were observed.

Centrifugal force: 1,500 G
Duration: one hour
Temperature: 25° C.

A: Neither separation of a supernatant liquid nor a precipitate was observed.

B: Slight amount of something resembling a precipitate collected on the bottom of the centrifugal tube was observed.

C: A precipitate collected on the bottom of the centrifugal tube was definitely observed.

D: A separation of a supernatant liquid and a precipitate was observed.

[Evaluation of Ink Preservation]

Each ink before and after degassing was poured into a glass tube, after which the tube was stoppered tightly, and stored in a thermostatic bath at 50° C. Three months later, the tube was removed from the bath and was cooled down to a room temperature, followed by determination of the particle diameter and viscosity of each ink. Evaluation was carried out by comparing the above data with that before storage.

A: The rate of change of both particle diameter and viscosity was less than 5%.

B: The rate of change of both particle diameter and viscosity was less than 10%.

C: The rate of change of particle diameter was 10-20%, while that of viscosity was less than 10%.

D: The rate of change of both particle diameter and viscosity was not less than 10%.

E: Separation was observed in the aged ink.

The results are given in Table 1.

However, the examples of the inks exhibiting high ink viscosity and employing an internal refluxing type hollow fiber degassing module showed a pressure loss of a hollow fiber degassing module during degassing in an amount of exceeding 0.1 MPa. As a result, it can be judged from the table that inks of the above examples exhibited marked degraded ink stability.

On the other hand, the inks exhibiting the same high viscosity as that of the above inks but employing an external refluxing type hollow fiber degassing module showed a pressure loss in the hollow fiber degassing module during degassing in an amount of less than 0.1 MPa, resulting in excellent ink stability. Further, it was shown that when the pressure loss of a hollow fiber degassing module at degassing was less than 0.05 MPa, the aforesaid inks exhibited a very high stability.

It was found from the above results that for degassing a pigment ink exhibiting ink viscosity of 10-50 mPa·second, sufficient degassing efficiency together with securing ink stability was provided when an external refluxing type hollow fiber degassing module was employed, and realizing a pressure loss of a hollow fiber degassing module at degassing to be in an amount of less than 0.1 MPa.

Example 2

[Degassing and Evaluation of Continuous Ejection]

Apparatuses were arranged as illustrated in the aforesaid FIG. 3, and each Ink 1-4 was subjected to ejection from a head for one continuous hour, while being degassed employing the following hollow fiber degassing modules (A) and (B). Ink ejection properties were evaluated using the 5 evaluation levels described below. The evaluation of ink ejection was carried out by observing via a stroboscope ink droplets ejected from the nozzles. The ink flow rate was set to 24 ml/minute corresponding to the ejection. A small tube pump, WPX-1 (produced by WELCO Co., Ltd., at discharge pressure of 0.2 MPa) was employed to feed the ink, assuming that a pump is practically incorporated into a printer. Head conditions: a nozzle number of 2,000, an amount of droplet of 10 pl, and an ejection frequency of 20 kHz.

Internal Refluxing Type Hollow Fiber Degassing Module A

A small hollow fiber degassing module of an internal refluxing type having a vessel and a gas discharging outlet to decompress the exterior of the hollow fibers was fabricated and employed, in which the liquid contact area was set to 0.15 m$^2$ employing a hollow fiber made of polytetrafluoroethylene

TABLE 1

| Experiment No. | Ink formula No. | Method | Degassing Amount of flow | Pressure loss | Before degassing Particle size | Viscosity | Centrifugation | Ink preservation | Note |
|---|---|---|---|---|---|---|---|---|---|
| 1A | Ink 1 | A | 300 ml/min | 0.08 MPa | 135 nm | 5.8 mPa · sec. | B | B | ** |
| 1B | | B | 300 ml/min | <0.01 MPa | | | A | A | ** |
| 2A | Ink 2 | A | 300 ml/min | 0.12 MPa | 150 nm | 11.8 mPa sec. | C | D | Comp. |
| 2B | | B | 300 ml/min | 0.01 MPa | | | A | A | Inv. |
| 3A | Ink 3 | A | 300 ml/min | 0.22 MPa | 160 nm | 17.5 mPa sec. | C | E | Comp. |
| 3B | | B | 300 ml/min | 0.03 MPa | | | A | A | Inv. |
| 4A | Ink 4 | A | 200 ml/min | 0.25 MPa | 142 nm | 45.1 mPa sec. | D | E | Comp. |
| 4B | | B | 200 ml/min | 0.06 MPa | | | B | B | Inv. |
| 5A | Ink 5 | A | 300 ml/min | 0.24 MPa | 155 nm | 26 mPa sec. | C | D | Comp. |
| 5B | | B | 300 ml/min | 0.03 MPa | | | A | B | Inv. |
| 6A | Ink 6 | A | 300 ml/min | 0.30 MPa | 150 nm | 28 mPa sec. | D | E | Comp. |
| 6B | | B | 300 ml/min | 0.05 MPa | | | A | B | Inv. |

Comp.: Comparative Example,
Inv.: Present Invention,
** Reference Example

The Inks 1A and 1B are reference examples of inks exhibiting a low ink viscosity of 5.8 mPa·second. The low viscosity ink exhibited a pressure loss in the hollow fiber degassing module during degassing in an amount of less than 0.1 MPa even when an internal refluxing type hollow fiber degassing module was employed, as well as exhibiting neither good nor bad ink stability.

resin having an inside diameter of 100 μm, and an inlet and an outlet to feed an ink into the interior of the hollow fiber were provided. Ink treated via the above module carries a number with "A" behind it. For example, the designation for an Ink 1 is 1A.

External Refluxing Type Hollow Fiber Degassing Module B

A small hollow fiber degassing module of an external refluxing type having a gas discharging outlet to decompress the interior of the hollow fibers was fabricated and employed, in which the liquid contact area was set to 0.15 m² employing a hollow fiber made of polytetrafluoroethylene resin having an inside diameter of 100 μm, and a vessel, as well as an inlet and an outlet, to feed an ink into the exterior of the hollow fiber were provided. Ink treated via the above module carries a number with "B" behind it. For example, the designation for an Ink 1 is 1B.

- A: All 2,000 nozzles were able to eject ink without fail over one continuous hour.
- B: All 2,000 nozzles were able to eject ink without fail for the first continuous 30 minutes, but abnormal ejection rate, which might have been due to cavitation, arose sometime between after the first 30 minutes and passage of one hour.
- C: An abnormal ejection rate, which might have been due to cavitation, arose during continuous 30 minutes.
- D: At least one nozzle prevented ejection of ink droplets, namely miss firing, sometime during the continuous hour. The above nozzle recovered immediately after cleaning.
- E: At least one nozzle prevented ejection of ink droplets sometime during the continuous hour. Such nozzles did not recover after cleaning, resulting in nozzle clogging.

[Determination of Pressure Loss of Hollow Fiber Degassing Module During Degassing]

Pressure loss of a hollow fiber degassing module during degassing was determined when an ink was fed at a rate of 24 ml/minute (assuming ink flow at conditions of 10 pl ink droplets, ejection frequency of 20 kHz, and a nozzle number of 2,000) with a pressure gauge being arranged immediately upstream of the degassing module illustrated in FIG. 3.

Table 2 shows the above results.

Inks 1A and 1B are reference examples of inks exhibiting a low ink viscosity of 5.8 mPa·second. Such low viscosity ink exhibited pressure loss of a hollow fiber degassing module during degassing in an amount of less than 0.1 MPa even when an internal refluxing type hollow fiber degassing module was employed, as well as having exhibited neither good nor bad ink stability.

However, the examples of inks exhibiting high ink viscosity and employing an internal refluxing type hollow fiber degassing module exhibited a pressure loss of a hollow fiber degassing module during degassing exceeding 0.1 MPa. As a result of this loss, it can be judged from the table that inks of the above examples had marked degraded ink ejection properties during continuous ejection.

On the other hand, the inks exhibiting the same high viscosity as that of the above inks and employing an external refluxing type hollow fiber degassing module exhibited a pressure loss of a hollow fiber degassing module during degassing in an amount of less than 0.1 MPa, resulting in excellent ink stability. Further, it was shown that when the pressure loss of a hollow fiber degassing module during degassing was less than 0.05 MPa, the aforesaid inks exhibited still more stable ink ejection properties.

The above results showed that a method to degas anywhere along the ink channel between the ink tank and the head is effective as a method to enhance continuous ejection reliability. In addition, in a recording method or in an ink-jet printer employing an ink exhibiting an ink viscosity of 10-50 Pa·second, employing an external refluxing type hollow fiber degassing module as the above method to degas along the ink channel is effective.

Example 3

<Preparation of Inks>

Inks 7-9 were prepared in the following manner.

[Preparation of Pigment Dispersions]

According to the formula of dispersion below, a pigment, a water-based solvent, and a high molecular weight dispersing agent were weighed and blended, and the total mass of the mixture was adjusted to 100 parts with deionized water. The

TABLE 2

| Ink No. | Ink formula No. | Degassing Method | Pressure loss | Before degassing Particle diameter | Viscosity | Continuous ejection | Note |
|---|---|---|---|---|---|---|---|
| 1A | Ink 1 | A(internal refluxing) | 0.06 MPa | 135 nm | 5.8 mPa·sec. | B | ** |
| 1B | | B(external refluxing) | <0.01 MPa | | | A | ** |
| 2A | Ink 2 | A(internal refluxing) | 0.16 MPa | 150 nm | 11.8 mPa·sec. | D | Comp. |
| 2B | | B(external refluxing) | 0.02 MPa | | | A | Inv. |
| 3A | Ink 3 | A(internal refluxing) | 0.22 MPa | 160 nm | 17.5 mPa·sec. | E | Comp. |
| 3B | | B(external refluxing) | 0.04 MPa | | | A | Inv. |
| 4A | Ink 4 | A(internal refluxing) | Prescribed amount of flow was not achieved | 142 nm | 45.1 mPa·sec. | — | Comp. |
| 4B | | B(external refluxing) | 0.08 MPa | | | B | Inv. |

** Reference Example,
Comp.: Comparative Example,
Inv.: Present Invention resultant solution was initially mixed with a dissolver, and the mixed solution was subjected to dispersion via a bead mill (for example, MiniCer, produced by Ashizawa Finetech Ltd.) filled with 340 g of zirconia beads to prepare a Pigment Dispersion 7.

Formula of Pigment Dispersion 7

| | |
|---|---|
| Carbon black (Mitsubishi MA100: produced by Mitsubishi Chemical Co.) | 15 parts |
| Disperbyk 190 (Big Chemie Corp.) (solid contents) | 6 parts |
| Dipropyleneglycolmonomethylether | 20 parts |

[Preparation of Ink 7]

Subsequently, according to the formula of the ink below, each component was weighed and blended, followed by filtration of the mixture employing a #1000 mesh metal filter to prepare Ink 7.

Formula of Ink 7

| | |
|---|---|
| Pigment Dispersion 7 | 20 parts |
| Dipropyleneglycolmonomethylether | 54 parts |
| Deionized water | 26 parts |

[Preparation of Inks 8 and 9]

Below each pigment dispersion and Inks 8 and 9 were prepared in a similar manner to the preparation of Ink 1 except for composition of additives.

Formula of Pigment Dispersion 8

| | |
|---|---|
| C.I. Pigment Red 122 | 20 parts |
| JONCRYL 501 (a dispersing agent produced by Johnson Polymer Co.) (solid contents) | 8 parts |
| Tripropyleneglycolmonomethylether | 20 parts |

Formula of Ink 8

| | |
|---|---|
| Pigment Dispersion 8 | 25 parts |
| Tripropyleneglycolmonomethylether | 65 parts |
| Deionized water | 10 parts |

Pigment Dispersion 9

| | |
|---|---|
| Carbon black (Mitsubishi MA7: produced by Mitsubishi Chemical Co.) | 15 Parts |
| JONCRYL 70 (a dispersing agent produced by Johnson Polymer Co.) (solid contents) | 20 parts |
| Glycerin | 20 parts |

Formula of Ink 9

| | |
|---|---|
| Pigment Dispersion 9 | 20 parts |
| Glycerin | 34 parts |
| Tripropyleneglycolmonomethylether | 5 parts |
| OLFINE E1010 (a surfactant produced by Nissin Chemical Industry Co., Ltd.) | 0.6 parts |
| Deionized water | 40.4 parts |

Degassing of Initial Ink and Preparation of Ink Pack

Each of Inks 7-9 degassed to less than 1 ppm employing a degassing module (SEPAREL EF-002A: produced by Dainippon Ink and Chemicals, Inc.). The degassed ink was made to fill in an aluminum laminated bag exhibiting no gas permeability to prepare Ink Packs 7-9.

<Head Maintenance via Ink Refluxing and Evaluation of Continuous Ejection>

The degassing apparatus of the external refluxing type hollow fiber degassing module shown in FIG. 4 was changed from (A) to (C), both of which are described below, and three types of ink flowing channels were arranged, in which each of (A) and (B) incorporated a pressure gauge before the degassing apparatus, whereby continuous ejection properties of Inks 7-9 via a line head was evaluated via the sequence below.

All nozzles of a line head were used for ink ejection, and two heads (totaling 1,024 nozzles), which were located at the center of the line head, were used for the evaluation of ejection. The evaluation was carried out with regard to cavitation and nozzle clogging separately using 5 evaluation levels. The evaluation of ink ejection was carried out by observing ink droplets ejected from nozzles via a stroboscope. During each sequence, degassing was carried out with the degassing module remaining decompressed to 20.3 kPa.

(A) External Refluxing Type Hollow Fiber Degassing Module: As the degassing device, a small hollow fiber degassing module of an external refluxing type was fabricated. The device was composed of a vessel, as well as an inlet and an outlet, to feed an ink into the exterior of the hollow fiber, and a gas discharging outlet to decompress the interior of the hollow fibers. The liquid contact area was set to 0.15 m$^2$ employing a hollow fiber made of polytetrafluoroethylene resin having an inside diameter of 100 μm.

(B) Internal Refluxing Type Hollow Fiber Degassing Module: As the degassing device, a small hollow fiber degassing module of an internal refluxing type was fabricated. The device was composed of an inlet and an outlet to feed an ink into the interior of the hollow fiber, and a vessel and a gas discharging outlet to decompress the exterior of the hollow fibers. The liquid contact area was set to 0.15 m$^2$ employing a hollow fiber made of polytetrafluoroethylene resin having an inside diameter of 100 μm.

(C) No degassing device was installed.

Sequence

1. Ink was introduced into the ink channel by opening electromagnetic valve A and closing electromagnetic valve B.

2. An amount of ink corresponding to the total volume (about 100 ml) of the circulation channels was circulate by closing electromagnetic valve A and opening electromagnetic valve B.

3. Ink droplets were discharged from the line head for one continuous hour, and discharge performance was observed. The line head was produced by assembling, as shown in FIG. 5(b), 12 heads having a nozzle resolution of 360 dpi and a nozzle number of 512.

Head Driving Conditions

The liquid droplets were 20 pl and the ejection frequency was set at 10 kHz.

<Evaluation of Properties>

Each property was evaluated using the criteria below.

<<Cavitation>>

A: All 1,024 nozzles were able to discharge ink without fail for one continuous hour.

B: All 1,024 nozzles were able to discharge ink without fail for the first continuous 30 minutes. Some time after which and the end of one hour, an abnormal ejection rate arose, which might have been due to cavitation.

C: All 1,024 nozzles were able to discharge ink without fail for the first continuous 30 minutes. Some time after which and the end of one hour, an abnormal ejection rate arose, which might have been due to cavitation. Further, at least one nozzle prevented ejection of ink droplets.

D: An abnormal ejection rate arose during the first continuous 30 minutes, which might have been due to cavitation, resulting in occurrence of at least of one nozzle which prevented ejection of ink droplets.

E: An abnormal ejection rate which was due to cavitation arose during the first continuous 10 minutes, resulting in occurrence of at least of one nozzle which prevented ejection of ink droplets.

<<Nozzle Clogging>>

A: No nozzle clogging was observed in any of the 1,024 nozzles during continuous ink ejection over one hour.

B: Nozzle clogging in 1-3 nozzles during ink ejection occurred within one continuous hour, but the nozzle immediately recovered via ink suction.

C: Nozzle clogging in 4-10 nozzles during ink ejection occurred within one continuous hour, but the nozzle immediately recovered via ink suction.

D: Recoverable nozzle clogging in not less than 11 nozzles during ink ejection occurred within one continuous hour.

E: Nozzle clogging in not less than one nozzle which did not recover via ink suction occurred during ink ejection within one continuous hour.

<<Pressure Loss of Hollow Fiber Degassing Module during Degassing>>

Pressure loss of a hollow fiber degassing module during degassing during ink circulation of the sequence 2 was determined via a pressure gauge which was arranged immediately upstream of the degassing apparatus.

The above results are shown in Table 3.

recover following maintenance. It is thought that high pressure applied on the pigment ink immediately upstream of the degassing module resulting in coagulation of pigment particles.

On the other hand, Present Inventions 1A, 2A, and 3A, in which degassing was carried out employing external refluxing type hollow fiber degassing module in the circulation channels, exhibited seldom occurrence of cavitation during continuous ejection, and also seldom occurrence of nozzle clogging in continuous ejection. Further, in cases where nozzle clogging arose, the clogging was relatively insignificant and the nozzles recovered full function via simple maintenance.

The above results show that in a printer incorporating ink circulation channels whereby an ink which is discharged from a head during maintenance is returned to the head, it is effective to have a degassing apparatus somewhere along the aforesaid ink circulation channels, in which the degassing apparatus is an external refluxing type hollow fiber degassing module.

What is claimed is:

1. A degassing method of an ink-jet ink comprising at least a pigment, and having a viscosity of not less than 10 mPa·second and not more than 50 mPa·second at 25° C., comprising the step of:
    carrying out degassing employing an external refluxing type hollow fiber degassing module, wherein a pressure loss of the ink at an ink inlet of the hollow fiber degassing module during degassing is less than 0.1 MPa.

2. The degassing method of the ink-jet ink described in claim 1, wherein the pressure loss of the ink at the ink inlet of the hollow fiber degassing module during degassing is less than 0.05 MPa.

TABLE 3

| Experiment No. | Ink formula No. | Degassing Method | Pressure loss | Before degassing Particle size | Viscosity | Continuous ejection Cavitation | Nozzle clogging |
| --- | --- | --- | --- | --- | --- | --- | --- |
| 1A(Present Invention) | Ink 1 | A(external refluxing) | 0.01 MPa | 150 nm | 11.8 mPa · sec. | A | A |
| 1B(Comparative Example) | | B(internal refluxing) | 0.14 MPa | | | C | D |
| 1C(Comparative Example) | | No degassing in printer | — | | | E | D |
| 2A(Present Invention) | Ink 2 | A(external refluxing) | 0.03 MPa | 160 nm | 17.5 mPa · sec. | A | A |
| 2B(Comparative Example) | | B(internal refluxing) | 0.21 MPa | | | B | E |
| 2C(Comparative Example ) | | No degassing in printer | — | | | D | D |
| 3A(Present Invention) | Ink 3 | A(external refluxing) | 0.06 MPa | 142 nm | 45.1 mPa · sec. | B | B |
| 3B(Comparative Example) | | B(internal refluxing) | 0.28 MPa | | | C | E |
| 3C(Comparative Example) | | No degassing in printer | — | | | E | D |

In the experiments of Comparative Examples 1C, 2C, and 3C, in which degassing in the printer was not employed, extreme cavitation arose. It is thought that air dissolved again in the ink during ink circulation operation.

Comparative Examples of 1B, 2B, and 3B, in which degassing was carried out employing internal refluxing type hollow fiber degassing module in the circulation channels, exhibited a high incidence of nozzle clogging in continuous ejection, and there were many cases of nozzle clogging which did not 3. The degassing method of the ink-jet ink described in claim 1,
    wherein the pigment contained in the ink-jet ink is dispersed employing a dispersing agent.

4. The degassing method of the ink-jet ink described in claim 1,
    wherein the ink-jet ink is a water-based pigment ink containing at least water and a water-soluble organic solvent.

5. The degassing method of the ink-jet ink described in claim 1,
wherein a surface tension of the ink-jet ink is not less than 25 mN/m and not more than 38 mN/m.

6. The degassing method of the ink-jet ink described in claim 1,
wherein an outside diameter of the hollow fiber membrane is not less than 150 μm and not more than 250 μm, and not less than 50 μm and not more than 180 μl.

7. The degassing method of the ink-jet ink described in claim 1,
wherein a material of the hollow fiber is 4-methylpentene-1 or a fluorine resin.

8. A production method of the ink-jet ink comprising a step of a degassing process using the degassing method of the ink-jet ink described in claim 1.

9. An ink-jet printer having an ink channel from an ink tank to a head,
wherein the printer features a degassing process along the ink channel using the degassing method of the ink-jet ink described in claim 1.

10. The ink-jet printer described in claim 9,
wherein the head is a line head.

11. The ink-jet printer having an ink circulation channel for recycling any ink-jet ink, discharged from a head, into the head,
wherein the printer has a degassing process along the ink circulation channel using the degassing method of the ink-jet ink described in claim 1.

12. The ink-jet printer described in claim 11,
wherein the head is a line head.

* * * * *